US008243097B2

(12) United States Patent
Pantfoerder

(10) Patent No.: US 8,243,097 B2
(45) Date of Patent: Aug. 14, 2012

(54) ELECTRONIC SIGHTING COMPASS

(75) Inventor: Achim Pantfoerder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 272 days.

(21) Appl. No.: 12/603,480

(22) Filed: Oct. 21, 2009

(65) Prior Publication Data

US 2011/0090244 A1   Apr. 21, 2011

(51) Int. Cl.
*G09G 5/00* (2006.01)

(52) U.S. Cl. ......................................... 345/619; 345/156

(58) Field of Classification Search .................. 345/619, 345/650, 659, 156
See application file for complete search history.

(56) References Cited

U.S. PATENT DOCUMENTS

| | | | |
|---|---|---|---|
| 6,291,906 B1 * | 9/2001 | Marcus et al. | 307/10.1 |
| 6,520,013 B1 | 2/2003 | Wehrenberg | |
| 2002/0167699 A1 * | 11/2002 | Verplaetse et al. | 359/158 |
| 2005/0206654 A1 | 9/2005 | Vaha-Sipila | |
| 2006/0052132 A1 * | 3/2006 | Naukkarinen et al. | 455/556.1 |
| 2006/0156565 A1 | 7/2006 | Linjama | |
| 2007/0162942 A1 | 7/2007 | Hamynen et al. | |
| 2009/0086047 A1 | 4/2009 | Suehiro | |
| 2009/0167919 A1 * | 7/2009 | Anttila et al. | 348/333.02 |
| 2010/0002015 A1 * | 1/2010 | Handa | 345/650 |

FOREIGN PATENT DOCUMENTS

| | | |
|---|---|---|
| WO | WO-2007125377 | 11/2007 |
| WO | WO-2008007260 | 1/2008 |

* cited by examiner

*Primary Examiner* — Chante Harrison
(74) *Attorney, Agent, or Firm* — Blakely, Sokoloff, Taylor & Zafman LLP

(57) ABSTRACT

A portable electronic device provides a compass bearing display juxtaposed with or superimposed on a camera viewfinder display. The device includes an image sensor and an electronic compass. When the device is held with the image sensor pointed in a generally horizontal direction, the displayed viewfinder image from the image sensor is combined with a graphic indicating a compass bearing corresponding to the imaging axis of the image sensor. The display may be presented as a linear scale to indicate off-axis headings as well.

17 Claims, 4 Drawing Sheets

ELECTRONIC SIGHTING COMPASS

BACKGROUND

1. Field

The present invention relates to a portable electronic device having a compass function and, more particularly, to a device wherein the compass function is integrated with a camera function to provide an electronic sighting compass.

2. Background

The magnetic compass has been an indispensable navigational tool for centuries. Advances in electronics have made possible a miniaturized electronic compass. Such an electronic compass may be incorporated into a portable electronic device that may be conveniently carried about. The device may be configured to include additional functionalities, such as those of a cellular phone handset, a personal digital assistant (PDA), a digital multimedia player, or a multi-function consumer electronic device combining some or all of the foregoing functions. Currently available portable electronic devices having a compass function may include a display with an electronic representation of a traditional compass rose.

It is often desirable to determine a compass bearing to a distant object. For this purpose, a magnetic compass fitted with a sighting device, referred to as a sighting compass, may be used. A bearing to a distant object can be readily determined by aligning the sighting device with the object while noting the compass reading.

SUMMARY

Implementation of the present invention provides a device in which a compass bearing display is juxtaposed with or superimposed on a camera viewfinder display. A portable electronic device includes an image sensor and an electronic compass. When the device is held with the image sensor pointed in a generally horizontal direction, the displayed viewfinder image from the image sensor is combined with a graphic display indicating a compass bearing corresponding to the imaging axis of the image sensor. The display may be presented as a linear scale to indicate off-axis headings as well.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

An embodiment of the invention with reference to the appended drawings is now explained. While numerous details are set forth, it is understood that some embodiments of the invention may be practiced without these details. In other instances, well-known circuits, structures, and techniques have not been shown in detail so as not to obscure the understanding of this description.

Figure 1:
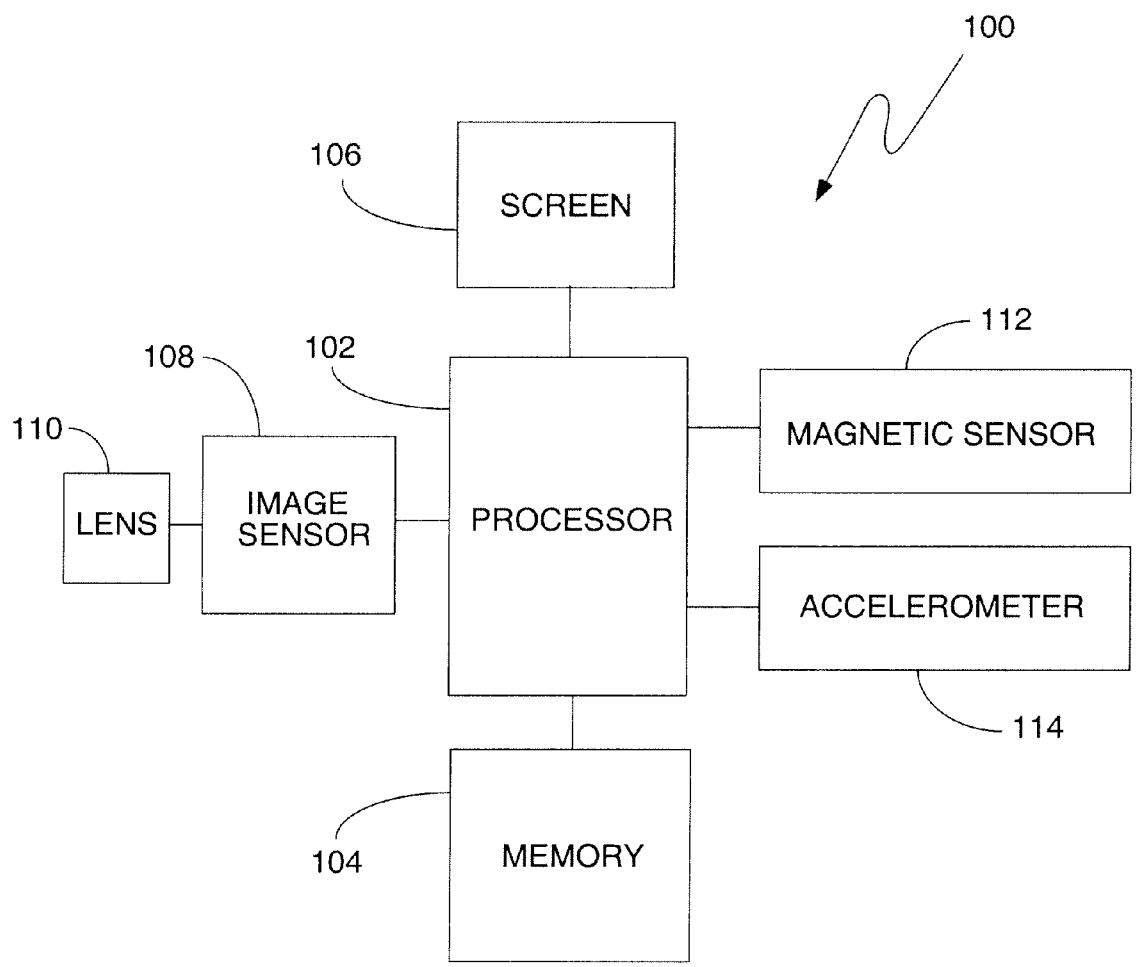
FIG. 1 is a functional block diagram of a portable electronic device in which the present invention may be implemented.

FIG. 1 is a block diagram of an exemplary portable electronic device 100 in accordance with an embodiment of the invention. The device 100 may be a portable electronic device having the functionality of a cellular phone handset, a personal digital assistant (PDA), a digital multimedia player, or a multi-function consumer electronic device combining some or all of the foregoing functions. Alternatively, the device 100 may be a personal computer, such as a laptop, tablet, or handheld computer.

The device 100 has a processor 102 that executes instructions to carry out operations associated with the device 100. The instructions may be retrieved from memory 104 and, when executed, control the reception and manipulation of input and output data between various components of device 100. The memory 104 may store an operating system program (not shown) that is executed by the processor 102 and one or more application programs to perform various functions, including those described below. The screen 106 displays a graphical user interface (GUI) to allow a user of the device 100 to interact with various application programs running in the device 100. The GUI displays icons or graphical images that represent application programs, files, and their associated commands on the screen 106. These may include windows, fields, dialog boxes, menus, buttons, cursors, scrollbars, etc. During operation, the user can select and activate various graphical images to initiate functions associated therewith.

The screen 106 may be a touch sensitive screen that also acts as an input device to transfer user inputs into the device 100. Such inputs are received via, for example, the user's finger touching the surface of the screen 106. The screen 106 and its associated circuitry recognizes touches, as well as the position and perhaps the magnitude of touches and their duration on the surface of the screen 106. This may be done by a gesture detection program that may be executed by the processor 102 or by a dedicated processor in order to reduce demands on the main processor 102.

Camera functionality of the device 100 may be enabled by a solid state image sensor 108, which is built into the device 100 and may be located at a focal plane of an optical system that includes the lens 110. The image sensor 108 and lens 110 have an imaging axis that is normal to display screen 106. An optical image of a scene before the camera is formed by lens 110 on the image sensor 108, and the sensor 108 responds by translating the optical information into a digital image or picture consisting of pixels that will then be stored in memory 104. The image sensor 108 may include a solid state image sensor chip with several options available for controlling how an image is captured. These options are set by image capture parameters that can be adjusted automatically by a camera application program executed in processor 102.

In the camera mode of operation, the image from image sensor 108 is displayed as a viewfinder image on screen 106. The GUI for the camera mode of operation provides graphics for user controls, including at least an image capture button.

Device 100 includes an orientation sensor, which may comprise accelerometer 112. The accelerometer detects orientation and movement of device 100. In one embodiment, the accelerometer 112 may be implemented as those described in U.S. Pat. No. 6,520,013, which is assigned to a common assignee of the present application. Alternatively, the accelerometer 112 may be implemented using a variety of accelerometers commercially available. For example, the accelerometer 112 may be a KGF01 accelerometer from Kionix or an ADXL311 accelerometer from Analog Devices.

Orientation and movement data provided by accelerometer 112 is available for use by various application programs executed in processor 102. For example, the sensed orientation of device 100 may be used to switch the display on screen 106 between portrait and landscape modes. Accelerometer 112 may include, in addition to acceleration sensing components, one or more controllers and associated firmware for processing outputs of the acceleration sensing components to develop motion vectors.

The compass function is performed using a magnetic sensor 114. This may be a conventional 3-axis magnetometer that senses the local magnetic field and outputs a vector having three components (e.g., x, y and z axis components). The sensor 114 may be implemented as part of a separate, integrated circuit or microelectronic die referred to as a compass chip. The compass function may require a calibrator (not shown) so that any unwanted interference field contribution can be identified and removed from a measurement provided by the magnetic sensor 114.

Figure 2:
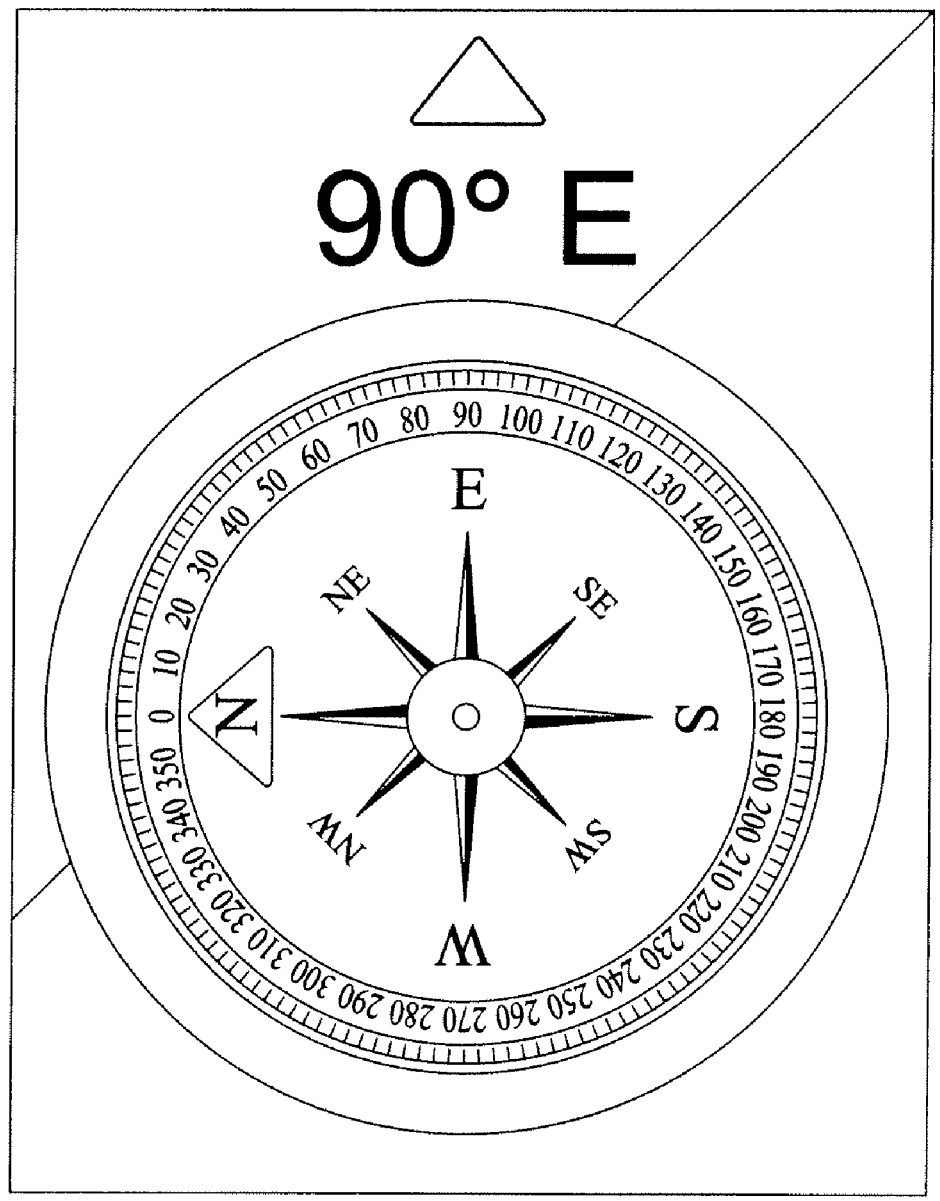
FIG. 2 illustrates a prior art compass display.

Device 100 may have a conventional compass mode in which information from the magnetic sensor 114 is displayed on screen 106 using a traditional compass rose. Such a display is shown in FIG. 2. This display is intended for use when the face of screen 106 is substantially horizontal, thereby providing the user with a digitally implemented equivalent of a conventional magnetic compass.

Figure 3:
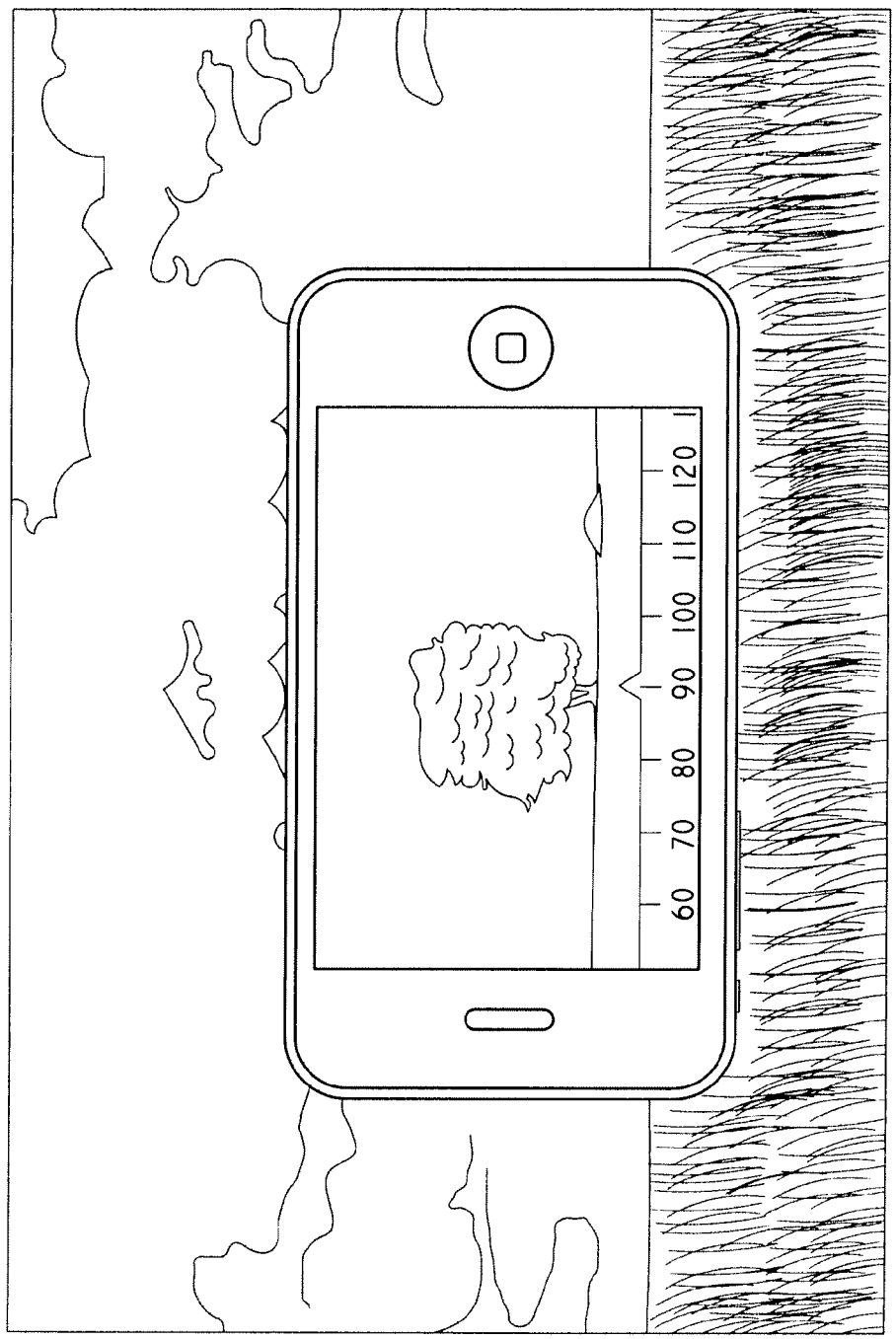
FIG. 3 illustrates a sighting compass display in accordance with an embodiment of the present invention.

A sighting compass mode of operation in accordance with the present invention combines the functions of the magnetic sensor 114 and image sensor 108. In this mode of operation, illustrated in FIG. 3, a compass scale 302 is juxtaposed with or superimposed on an image 304 from image sensor 108. For the most beneficial operation in this mode, device 100 is held so that the optical axis of image sensor 108 is approximately horizontal and pointing at a distant object, such as a tree as shown in FIG. 3. This allows the user of device 100 to accurately determine the bearing to the distant object.

The sighting compass mode of operation illustrated in FIG. 3 may be entered from the normal compass mode of operation illustrated in FIG. 2. As mentioned above, the normal compass mode of operation provides the best results when device 100 is held so that screen 106 is substantially horizontal. As the user tilts device 100 vertically (in either the portrait or landscape orientation), the compass rose is replaced with scale 302 on the lower part of the display showing the compass heading normal to the screen 106. As device 100 is tilted up, the camera mode is also activated and the upper part of the display screen displays a camera viewfinder image from the image sensor 108 showing the scenery along the optical axis of sensor 108. Since the optical axis is normal to the display screen, the center of scale 302 shows the compass heading to whatever object appears in the middle of the viewfinder image. If the device 100 is panned in an approximately horizontal plane, the bearing data displayed in scale 302 refreshes to provide current data.

Figure 4:
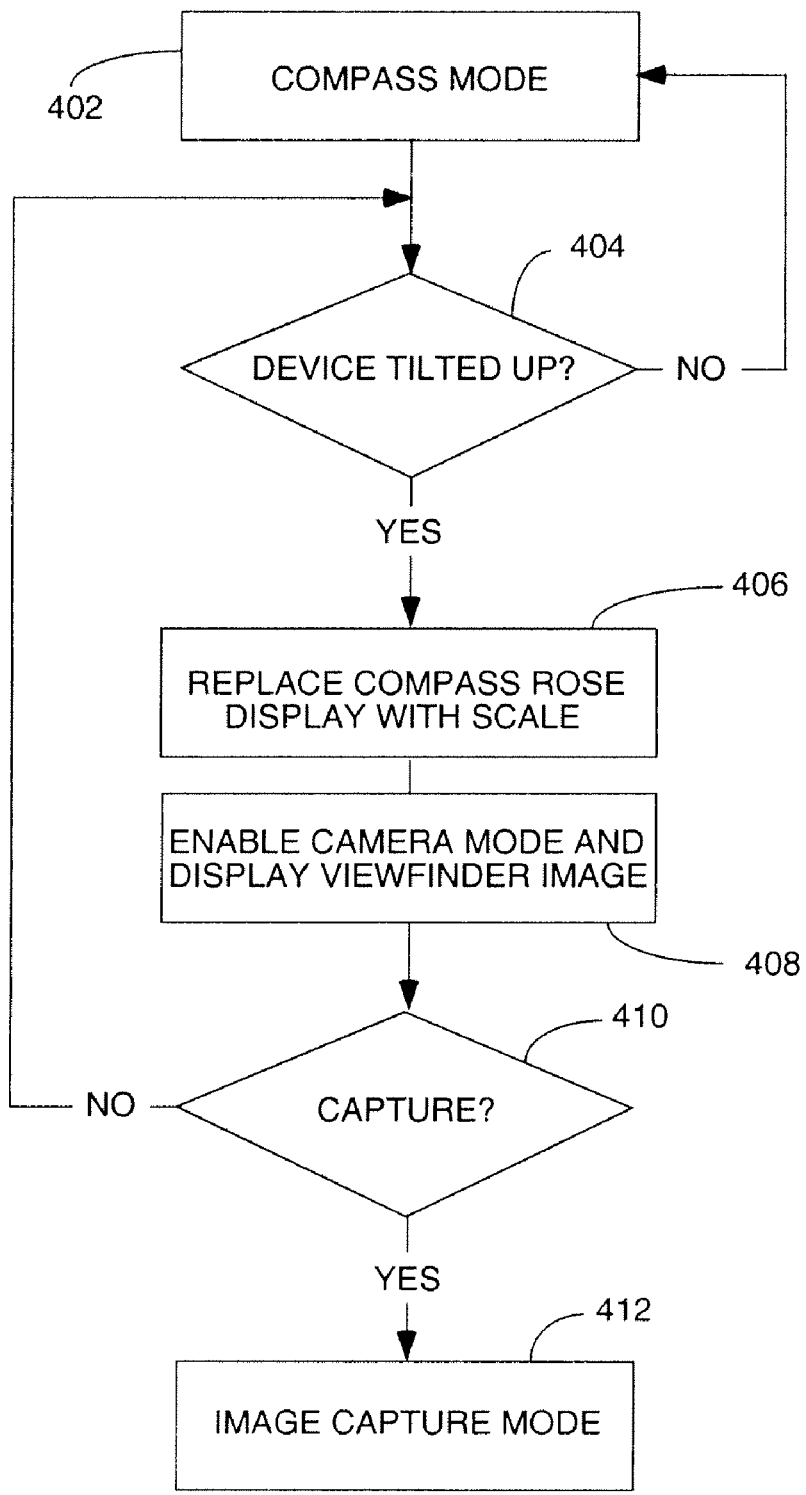
FIG. 4 is a functional flow diagram of a sighting compass mode of operation according to an embodiment of the present invention.

FIG. 4 is a functional flow diagram of the sighting compass mode of operation described above. As already mentioned, the mode is entered from the normal compass mode of operation 402. Accelerometer data is queried at 404 to determine if the device 100 has been tilted up. If not, the normal compass mode continues. If upward tilting of the device is detected, the compass rose display is replaced with the scale display at 406 and the camera viewfinder display is enabled at 408. The particular tilt angle at which the sighting compass mode is entered is a matter of design choice; however, the mode should be entered by the time device 100 is oriented with the imaging axis of image sensor 108 is approximately horizontal.

As in the normal camera mode of operation, a capture icon may be displayed on screen 106 in the sighting compass mode. User selection of the capture icon is monitored at 410. If the user selects the capture icon, the image capture mode of operation is entered at 412. Otherwise, the sighting compass mode continues to monitor the accelerometer data at 404. In the absence of any other user input, operation remains in the sighting compass mode for as long as the device 100 remains tilted up and reverts to the normal compass mode when the device is tilted back down.

An embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

The invention is not limited to the specific embodiments described above. There are numerous variations to different aspects of the invention described above, which in the interest of conciseness have not been provided in detail. Accordingly, other embodiments are within the scope of the claims.

What is claimed is:

1. A method comprising, on a portable multi-function electronic device:
    while in compass mode, displaying, on a display screen of the device, a compass rose indicating a compass bearing while the display screen is substantially horizontal; and
    in response to the display screen being tilted up from the substantially horizontal, replacing the compass rose with a graphic indication of the compass bearing on the display screen along with an image from an image sensor.

2. The method of claim 1 further comprising sensing an orientation of the portable multi-function electronic device and displaying the graphic indication of the compass bearing on the display screen when an imaging axis of the image sensor is approximately horizontal.

3. The method of claim 1 wherein the graphic indication of the compass bearing comprises a linear scale with at least one numerical value.

4. The method of claim 1 wherein the graphic indication of the compass bearing is displayed at the bottom of the display screen while the display screen is substantially vertical.

5. The method of claim 1 wherein the image from the image sensor is a camera viewfinder image produced by camera mode of the device being active.

6. The method of claim 1 wherein replacing the compass rose with a graphic indication of the compass bearing comprises:
    activating camera mode of the device;
    replacing the compass rose with a camera viewfinder image; and
    one of superimposing and juxtaposing a compass scale over the camera viewfinder image.

7. A portable multi-function electronic device comprising:
an image sensor;
a display screen;
a magnetic sensor; and
a processor coupled to the display screen and the magnetic sensor to provide a compass rose indicating a compass bearing, for display on the display screen while the display screen is substantially horizontal, the processor to provide a graphic indication of the compass bearing, displayed on the display screen, along with an image from the image sensor that replaces the compass rose, as the device is tilted vertically by its user.

8. The portable electronic device of claim 7 further comprising an orientation sensor to sense an orientation of the portable electronic device and operably coupled to the processor to provide the graphic indication of the compass be when an imaging axis of the image sensor is approximately horizontal.

9. The portable electronic device of claim 7 wherein the graphic indication of the compass bearing comprises a linear scale with at least one numerical value.

10. The portable multi-function electronic device of claim 7 wherein the processor is to provide the image from the image sensor as a camera viewfinder image while camera mode of the device is activated.

11. The portable multi-function electronic device of claim 10 wherein the processor is to activate camera mode of the device as the device is tilted vertically by its user and the processor is to one of superimpose and juxtapose a compass scale over the camera viewfinder image.

12. An article of manufacture comprising:
a machine-readable medium having stored therein instructions that program a processor, of a portable multi-function electronic device having an image sensor, a display screen and a magnetic sensor, to provide a compass rose, for display on the display screen, indicating a compass bearing during compass mode and while the display screen is substantially horizontal, and to activate camera mode as the device is tilted up from the horizontal with the compass rose being replaced with a graphic indication of the compass bearing along with a camera viewfinder image.

13. The article of manufacture of claim 12 wherein the machine-readable medium has stored therein further instructions to program the processor to sense an orientation of the portable multi-function electronic device and to display the graphic indication of the compass bearing along with the camera viewfinder image when an imaging axis of the image sensor is approximately horizontal.

14. The article of manufacture of claim 12 wherein the graphic indication of the compass bearing comprises a linear scale with at least one numerical value.

15. The article of manufacture of claim 12 wherein the machine-readable medium has stored therein instructions that program the processor to superimpose the graphic indication of the compass bearing on the camera viewfinder image.

16. The article of manufacture of claim 12 wherein the machine-readable medium has stored therein instructions that program the processor to juxtapose the graphic indication of the compass bearing with the camera viewfinder image.

17. The article of manufacture of claim 12 wherein the machine-readable medium has stored therein further instructions to program the processor to refresh the graphic indication of the compass bearing on the display screen as the device is panned in an approximately horizontal plane.

* * * * *